US012779445B2

(12) United States Patent
Alvez et al.

(10) Patent No.: US 12,779,445 B2
(45) Date of Patent: Nov. 3, 2026

(54) METHODS FOR IMPROVING METAL DISPERSION OF A CATALYST

(71) Applicant: Chevron Phillips Chemical Company LP, The Woodlands, TX (US)

(72) Inventors: Gabriela D. Alvez, Kingwood, TX (US); Joseph J. Bergmeister, Spring, TX (US); Cori Demmelmaier-Chang, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 601 days.

(21) Appl. No.: 18/448,883

(22) Filed: Aug. 11, 2023

(65) Prior Publication Data

US 2025/0050323 A1 Feb. 13, 2025

(51) Int. Cl.

*B01J 38/44* (2006.01)
*B01J 23/42* (2006.01)
*B01J 38/02* (2006.01)

(52) U.S. Cl.

CPC ............... *B01J 38/44* (2013.01); *B01J 23/42* (2013.01); *B01J 38/02* (2013.01)

(58) Field of Classification Search

CPC ............. B01J 23/42; B01J 38/02; B01J 38/44
See application file for complete search history.

(56) References Cited

U.S. PATENT DOCUMENTS

| | | | | |
|---|---|---|---|---|
| 10,300,476 | B2 | 5/2019 | Alvez-Manoli | |
| 2018/0333705 | A1 * | 11/2018 | Snell ........................ | B01J 23/96 |

FOREIGN PATENT DOCUMENTS

| | | | |
|---|---|---|---|
| WO | 2013134055 | A1 | 9/2013 |
| WO | 2018213466 | A1 | 11/2018 |
| WO | 2018213553 | A1 | 11/2018 |

OTHER PUBLICATIONS

International Search Report & Written Opinion issued in corresponding PCT Application No. PCT/US2024/041652 mailed on Oct. 17, 2024. 9 pp.

* cited by examiner

*Primary Examiner* — Brian A McCaig
(74) *Attorney, Agent, or Firm* — Eversheds Sutherland (US) LLP

(57) ABSTRACT

Methods of improving metal dispersion of a catalyst, such as by contacting a spent catalyst and a stream including chlorine gas, and a stream including oxygen gas to form a regenerated catalyst. The regenerated catalyst may be used to catalyze a chemical reaction, and, after the chemical reaction, be regenerated one or more additional times.

19 Claims, 3 Drawing Sheets

METHODS FOR IMPROVING METAL DISPERSION OF A CATALYST

TECHNICAL FIELD OF THE INVENTION

This disclosure relates to methods of improving metal dispersion of a catalyst, and the use of regenerated catalysts in catalyzing chemical reactions.

BACKGROUND

Catalysts, such as aromatization catalysts, can be susceptible to one or more deactivation mechanisms. The deactivation mechanisms include, but are not limited to, coke formation, metal sintering, loss of promoters, and metal migration. Due to metal sintering, the dispersion of a metal in a catalyst can be negatively impacted.

There remains a need for methods of improving metal dispersion of catalysts, such as spent aromatization catalysts.

SUMMARY

This summary is provided to introduce various concepts in a simplified form that are further described below in the detailed description. This summary is not intended to identify required or essential features of the claimed subject matter nor is the summary intended to limit the scope of the claimed subject matter.

Provided herein are methods of regenerating a spent catalyst, such as a spent catalyst that includes a transition metal and a catalyst support.

In one aspect, the methods include contacting a spent catalyst and a first stream that includes chlorine gas ($Cl_2$) to produce a chlorinated catalyst; and contacting the chlorinated catalyst and a second stream that includes oxygen gas ($O_2$) to form a regenerated catalyst.

Also provided herein are methods are catalyzing a chemical reaction with a regenerated catalyst.

In one aspect, the methods include catalyzing a chemical reaction with a regenerated catalyst, such as a catalyst regenerated by any of the methods herein. The chemical reaction may convert a regenerated catalyst to a second spent catalyst. The second spent catalyst may be regenerated by any of the methods described herein.

Additional aspects will be set forth in part in the description which follows, and in part will be obvious from the description, or may be learned by practice of the aspects described herein. The advantages described herein may be realized and attained by means of the elements and combinations particularly pointed out in the appended claims. It is to be understood that both the foregoing general description and the following detailed description are exemplary and explanatory only and are not restrictive.

DEFINITIONS

Figure 1:
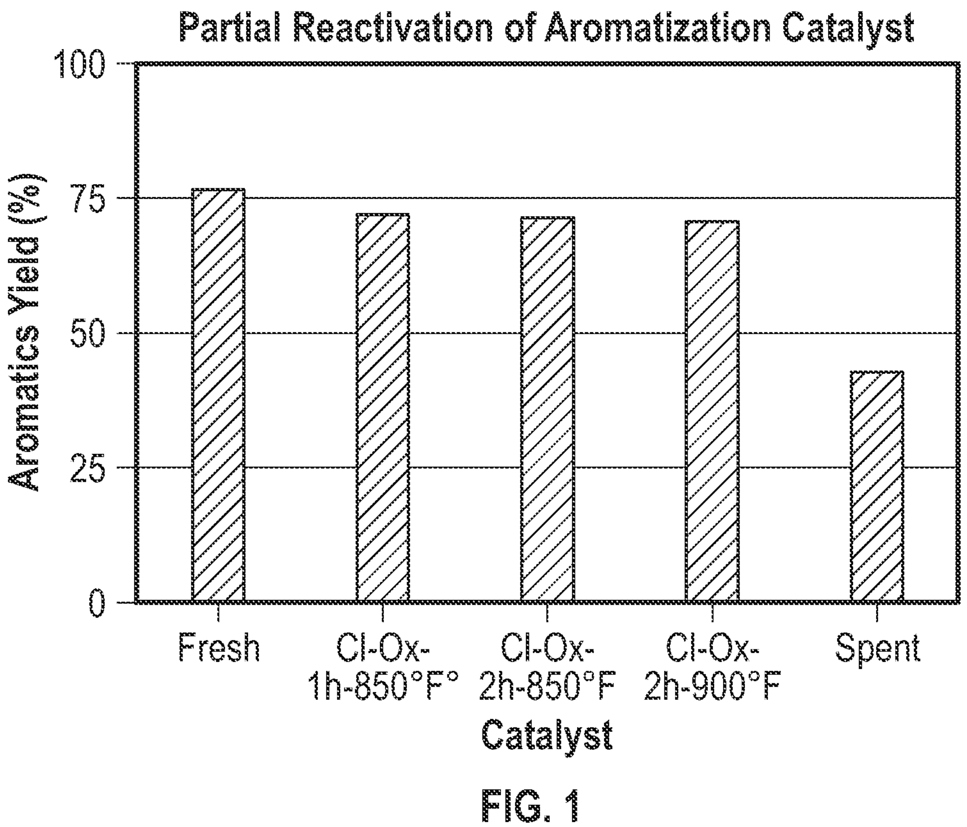
FIG. 1 depicts the aromatics yield of embodiments of fresh, spent, and catalysts treated according to an embodiment of a method provided herein.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

As the various features of the subject matter of this disclosure are described, within particular aspect, a combination or combinations of the different features may be envisioned. For every aspect of every feature disclosed herein, all combinations that do not detrimentally affect the designs, compositions, systems, processes, or methods described herein are contemplated with or without the express description of that particular combination. Therefore, unless explicitly stated to the contrary, any aspect of feature disclosed here may be combined to describe and disclose the inventive designs, compositions, systems, processes, or methods consistent with the entire disclosure.

While compositions and methods are described in terms of "comprising" various components or steps, the compositions and methods can also "consist essentially of" or "consist of" the various components or steps, unless stated otherwise.

The terms "including", "with", and "having", as used herein, are defined as comprising (i.e., open language), unless specified otherwise.

The terms "a," "an," and "the" are intended to include plural alternatives, e.g., at least one. For instance, the disclosure of "a transition metal," "a spent catalyst," and the like, is meant to encompass one, or mixtures or combinations of more than one, transition metal, spent catalyst, and the like, unless otherwise specified.

Various numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. For example, by disclosing that the contacting of a chlorinated catalyst and an inert gas occurs for about 10 hours to about 12 hours, or about 10.0 to about 12.0 hours, Applicant's intent is to recite individually about 10 hours, about 10.1 hours, about 10.2 hours, about 10.3 hours, about 10.4 hours, about 10.5 hours, about 10.6 hours, about 10.7 hours, about 10.8 hours, about 10.9 hours, about 11 hours, about 11.1 hours, about 11.2 hours, about 11.3 hours, about 11.4 hours, about 11.5 hours, about 11.6 hours, about 11.7 hours, about 11.8 hours, about 11.9 hours, and about 12 hours, including any sub-ranges and combinations of sub-ranges encompassed therein, and these methods of describing such ranges are interchangeable. Moreover, all numerical end points of ranges disclosed herein are approximate, unless excluded by proviso. As a representative example, if Applicants state that one or more steps in the processes disclosed herein can be conducted at a temperature in a range from 10° C. to 75° C., this range should be interpreted as encompassing temperatures in a range from "about" 10° C. to "about" 75° C. unless otherwise stated.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, each use of the term "about" can, independently, mean±20% of the stated value, ±15% of the stated value, ±10% of the stated value, ±5% of the stated value, or ±3% of the stated value.

Applicants reserve the right to proviso out or exclude any individual members of any such group of values or ranges, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference or prior disclosure that Applicants can be unaware of at the time of the filing of the application.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure also encompasses all enantiomers, diastereomers, and other optical isomers (if there are any) whether in enantiomeric or racemic forms, as well as mixtures of stereoisomers, as would be recognized by a skilled artisan, unless otherwise specified. For example, a general reference to hexane or hexanes includes n-hexane, 2-methylpentane, 3-methylpentane, 2,2-dimethylbutane, and 2,3-dimethyl-butane; and a general reference to a butyl group includes an n-butyl group, a sec-butyl group, an iso-butyl group, and a t-butyl group.

The term "substituted" when used to describe a group, for example, when referring to a substituted analog of a particular group, is intended to describe the compound or group wherein any non-hydrogen moiety formally replaces hydrogen in that group or compound, and is intended to be non-limiting. A compound or group can also be referred to herein as "unsubstituted" or by equivalent terms such as "non-substituted," which refers to the original group or compound. "Substituted" is intended to be non-limiting and include inorganic substituents or organic substituents as specified and as understood by one of ordinary skill in the art.

The terms "contact product," "contacting," and the like, are used herein to describe compositions and methods wherein the components are contacted together in any order, in any manner, and for any length of time, unless specified otherwise. For example, the components can be contacted by blending or mixing. Further, unless otherwise specified, the contacting of any component can occur in the presence or absence of any other component of the compositions and methods described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Similarly, "contacting" two or more components can result in a reaction product or a reaction mixture. Consequently, depending upon the circumstances, a "contact product" can be a mixture, a reaction mixture, or a reaction product.

"Conditions for aromatizing aliphatic hydrocarbons" means conditions for aromatizing at least a portion of the aliphatic hydrocarbons in a feedstock containing aliphatic hydrocarbons when contacted with a catalyst as described herein, such that the catalyst bed discharge comprises at least some aromatic hydrocarbons. Some unreacted aliphatic hydrocarbons will also be present in the catalyst bed discharge.

Generally, groups of elements are indicated using the numbering scheme indicated in the version of the periodic table of elements published in Chemical and Engineering News, 63 (5), 27, 1985. In some instances, a group of elements may be indicated using a common name assigned to the group; for example, alkali metals for Group 1 elements, alkaline earth metals for Group 2 elements, transition metals for Group 3-12 elements, halogens or halides for Group 17 elements, and the like.

In one aspect, a chemical "group" may be defined or described according to how that group is formally derived from a reference or "parent" compound, for example, by the number of hydrogen atoms removed from the parent compound to generate the group, even if that group is not literally synthesized in such a manner. These groups may be utilized as substituents or coordinated or bonded to metal atoms. By way of example, an "alkyl group" formally may be derived by removing one hydrogen atom from an alkane. The disclosure that a substituent, ligand, or other chemical moiety may constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

As used herein, the term "hydrocarbon" refers to a compound containing only carbon and hydrogen atoms. Other identifiers may be utilized to indicate the presence of particular groups, if any, in the hydrocarbon. For example, halogenated hydrocarbon indicates the presence of one or more halogen atoms replacing an equivalent number of hydrogen atoms in the hydrocarbon.

An "aromatic" compound or "aromatic hydrocarbon" is a compound containing a cyclically conjugated double bond system that follows the Hückel (4n+2) rule and contains (4n+2) pi-electrons, where n is an integer from 1 to 5. Aromatic hydrocarbons include "arenes" (aromatic compounds, for example, benzene, toluene, and xylenes) and "heteroarenes" (heteroaromatic compounds formally derived from arenes by replacement of one or more methine (—C═) carbon atoms of the cyclically conjugated double bond system with a trivalent or divalent heteroatoms, in such a way as to maintain the continuous pi-electron system characteristic of an aromatic system and a number of out-of-plane pi-electrons corresponding to the Hückel rule (4n+

2)). As disclosed herein, the term "substituted" may be used to describe an aromatic group, arene, or heteroarene, wherein a non-hydrogen moiety formally replaces a hydrogen atom in the compound, and is intended to be non-limiting, unless specified otherwise.

As used herein, the term "alkane" refers to a saturated hydrocarbon compound. Other identifiers may be utilized to indicate the presence of particular groups, if any, in the alkane (for example, halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. The alkane or alkyl group may be linear or branched unless otherwise specified.

A "cycloalkane" is used herein to refer to a saturated cyclic hydrocarbon, with or without side chains, for example, cyclobutane, cyclopentane, cyclohexane, methyl cyclopentane, and methyl cyclohexane. Other identifiers may be utilized to indicate the presence of particular groups, if any, in the cycloalkane (for example, halogenated cycloalkane indicates the presence of one or more halogen atoms replacing an equivalent number of hydrogen atoms in the cycloalkane).

An "aliphatic" compound or "aliphatic hydrocarbon" is defined according to the IUPAC recommended definition to mean an acyclic or cyclic, saturated or unsaturated carbon compound, excluding aromatic compounds. That is, an aliphatic compound is a non-aromatic organic compound.

The term "hydrocarbyl group" is used herein in accordance with the definition specified by IUPAC: a univalent group formed by removing a hydrogen atom from a hydrocarbon (that is, a group containing only carbon and hydrogen). Thus, a hydrocarbyl group includes alkyl groups (linear or branched), cycloalkyl groups, alkenyl groups, aryl groups, and the like. Non-limiting examples of hydrocarbyl groups include methyl, ethyl, butyl, hexyl, phenyl, tolyl, propenyl, and the like.

As used herein, a "paraffin" refers to a non-cyclic, linear or branched saturated hydrocarbons and includes alkanes. For example, a C6 paraffin is a non-cyclic, linear or branched hydrocarbon having 6 carbon atoms per molecule. Normal hexane, methylpentanes, dimethylbutanes are examples of C6 paraffins. A paraffin-containing feed comprises non-cyclic saturated hydrocarbons, such as normal paraffins, isoparaffins, and mixtures thereof.

As used herein, a "naphthene" and "naphthenic" are terms used to describe cyclic saturated hydrocarbons, and includes cycloalkanes and their alkyl-substituted analogs. Therefore, a "naphthene" is a cyclic, saturated hydrocarbon having one or more rings of carbon atoms in its chemical structure and is used herein to mean the same as "cycloalkane." If such a cyclic structure includes unsaturated carbon-carbon bonds but is not aromatic, such compounds would be aliphatic, but not naphthenic. In some embodiments, a naphthene is a cyclic, saturated hydrocarbon having from 5 to 8 carbon atoms in the cyclic structure, including substituted (particularly alkyl-substituted) analogs thereof.

As used herein, "olefin" is an acyclic or cyclic hydrocarbon having one or more carbon-carbon double bonds, apart from the formal ones in aromatic compounds. Olefins include alkenes, cycloalkenes, and corresponding polyenes.

As used herein, "naphtha" is a petroleum distillate fraction boiling within the range of from 50° F. (10° C.) to 550° F. (260° C.). In some embodiments, naphtha boils within the range of 70° F. (21° C.) to 450° F. (232° C.), and more typically within the range of 80° F. (27° C.) to 400° F. (204° C.), and often within the range of 90° F. (32° C.) to 360° F. (182° C.). In some embodiments, at least 85 vol. % (volume percent) of naphtha boils within the range of from 50° F. (10° C.) to 550° F. (260° C.), and more typically within the range of from 70° F. (21° C.) to 450° F. (232° C.). In embodiments, at least 85 vol. % of naphtha is in the C4 to C12 range, and more typically in the C5 to C11 range, and often in the C6 to C10 range. Naphtha can include, for example, straight run naphthas, paraffinic and naphthenic raffinates from aromatic extraction or adsorption, C6 to C10 paraffin and naphthene containing feeds, bio-derived naphtha, naphtha from hydrocarbon synthesis processes, including Fischer-Tropsch and methanol synthesis processes, as well as naphtha from other refinery processes, such as hydrocracking or conventional reforming.

As used herein, the term "convertible hydrocarbon", "convertible C6 species" or "convertible C7 species" refers to hydrocarbon compounds that may be selectively converted to aromatic products such as aromatic hydrocarbons under aromatization process conditions. In some aspects, the feed stream comprises a highly branched hydrocarbon that is not selectively converted to aromatic hydrocarbons under conventional aromatization process conditions. While a "highly branched hydrocarbon" is a hydrocarbon that is not selectively convertible to form aromatic hydrocarbons under conventional aromatization process conditions. For example, a "highly branched hydrocarbon" can comprise highly-branched hydrocarbons having six or seven carbon atoms with an internal quaternary carbon or hydrocarbons having six carbons atoms and two adjacent internal tertiary carbons or mixtures thereof. The highly branched hydrocarbons may include, but are not limited to, dimethylbutanes (for example, 2,2-dimethylbutane, 2,3-dimethylbutane), dimethylpentanes (for example, 2,2-dimethylpentane, 3,3-dimethylpentane), trimethylbutanes (for example, 2,2,3-trimethylbutane) and mixtures thereof. The highly branched hydrocarbons are not selectively convertible aromatic hydrocarbons and instead convert to light hydrocarbons under aromatization process conditions. The convertible components may comprise methylpentanes, methylhexanes, dimethylpentanes or mixtures thereof, and/or the selectively convertible components may comprise at least one of 2-methylpentane, 3-methylpentane, 2,4-dimethylpentane, 2,3-dimethylpentane, n-hexane, 2-methylhexane, 3-methylhexane, n-heptane, or mixtures thereof. The selectively convertible components readily convert to aromatic hydrocarbons without the production of light hydrocarbons.

As used herein "primary aromatic hydrocarbon," "primary aromatic product," "desired hydrocarbon product," and "particular aromatic species" are used interchangeably and refer to the aromatic hydrocarbons that is the desired end product of the reaction and comprises aromatic hydrocarbons that has been generated from a feed that includes a renewable cellulose source. For example, the desired product may be benzene while toluene and xylenes may be by-products, or the desired product may be xylenes while benzene and toluene may be by-products.

A "Group 8-10" metal includes each of the Group 8 metals iron, ruthenium, and osmium, each of the Group 9 metals cobalt, rhodium, and iridium, and each of the Group 10 metals nickel, palladium, and platinum. The Group 8-10 metals may also be referred to using the earlier nomenclature, the Group VIII metals, which also encompasses all of iron, ruthenium, osmium, cobalt, rhodium, iridium, nickel, palladium, and platinum. Generally, describing the catalyst as a Group 8-10 metal catalyst or as comprising a Group 8-10 metal, is intended to encompass catalysts that include at least one Group 8-10 metal and optionally other metals, such as Pt/Sn and Pt/Re.

The term "platinum metal" is used herein to designate the 2nd and 3rd row transition metals of Groups 8-10, namely, ruthenium, osmium, rhodium, iridium, palladium, and platinum.

The term "noble metal" is generally used to describe specific metals that are resistant to corrosion and this term is used herein to include certain 2nd and 3rd row transition metals, but no first row transition metals. Generally, noble metals include ruthenium, osmium, rhodium, iridium, palladium, platinum, silver, and gold. Accordingly, the Group 8-10 noble metals are also the platinum metals.

As used herein, the term "bound", is intended to describe a zeolite-binder combination or other support-binder combination that is formed into aggregates such as pellets, pills, extrudates and the like. The term "catalyst base", as used herein, refers to a bound zeolite or bound support.

The term "catalyst" is used herein in a broad sense and includes the final catalyst as well as precursors of the final catalyst. Precursors of the final catalyst include, for example, the calcined form of the catalyst containing the catalytic metal and also the catalyst prior to activation by reduction. The term "catalyst" is thus used to refer to the activated catalyst in some contexts herein, and in other contexts to refer to precursor forms of the catalyst, as will be understood by skilled persons from the context.

The term "sulfur sensitive" describes catalysts that are particularly sensitive to the presence of sulfur in the feedstock. Generally, these catalysts require the amount of sulfur in the feedstock to be reduced to less than 5 ppm by hydrotreating, adsorbents, or a combination thereof. As used herein the terms "aromatization reactor system," "aromatization reactor unit," "catalytic reactor system," and "catalytic reactor unit" when referring to aromatization reactor systems also refer to the reactor vessel, reactor internals, and associated processing equipment as the context allows, including but not limited to the catalyst, inert packing materials, scallops, flow distributors, center pipes, reactor ports, catalyst transfer and distribution system, furnaces and other heating devices, heat transfer equipment, and piping. The aromatization reactor system described may comprise a fixed catalyst bed system, a moving catalyst bed system, a fluidized catalyst bed system, or combinations thereof. Such aromatization reactor systems may be batch or continuous. In a fixed bed system, the flow of the feed can be upward, downward, or radially through the reactor. In an aspect, the first catalyst bed, the intermediate catalyst beds, and the last catalyst bed are in a radial flow reactor.

The term "catalyst bed", such as first, second, or intermediate catalyst bed, is used herein to refer to a specific catalyst composition which constitutes at least a portion of, or all of, the catalyst material in a single aromatization reactor. For example, a "first catalyst bed" can occupy the entirety of one aromatization reactor, or it can occupy a portion of one aromatization reactor while a "second catalyst bed" occupies the remaining portion of the aromatization reactor. More typically, each catalyst bed can occupy the entirety of one aromatization reactor. Generally, and unless specified otherwise or the context requires otherwise, multiple aromatization reactors are described as having different catalyst beds, regardless of whether their catalysts have identical or different compositions.

The term "halogen" has its usual meaning and, as the context allows, includes halides. Therefore, examples of halogens include fluorine, fluoride, chlorine, chloride, bromine, bromide, iodine, and iodide. Further, the use of the term "fluoride" and "chloride" when describing the catalyst components or catalyst composition such as weight percentage or mole percentage of these components, does not depend on their presence in the catalyst in any particular molecular or ionic form.

Molar selectivities are defined as follows:

$$\text{Benzene selectivity: } S_{Bz} = \frac{\dot{n}_{Bz,prod}}{\dot{n}_{conv\ C6,feed} - \dot{n}_{conv\ C6,prod}} \quad \text{Eq. 1}$$

$$\text{Toluene selectivity: } S_{Tol} = \frac{\dot{n}_{Tol,prod}}{\dot{n}_{conv\ C7,feed} - \dot{n}_{conv\ C7,prod}} \quad \text{Eq. 2}$$

$$\text{Benzene + Toluene selectivity: } S_{Bz+Tol} = \frac{\dot{n}_{Bz,prod} + \dot{n}_{Tol,prod}}{\dot{n}_{conv\ C6,C7,feed} - \dot{n}_{conv\ C6,C7,prod}} \quad \text{Eq. 3}$$

$$\text{Aromatics selectivity: } S_{arom} = \frac{\dot{n}_{Bz,prod} + \dot{n}_{Tol,prod} + \dot{n}_{C8+arom,prod}}{\dot{n}_{conv\ C6-C8+,feed} - \dot{n}_{conv\ C6-C8+,prod}} \quad \text{Eq. 4}$$

Conversion is defined as the number of moles converted per mole of "convertible" hydrocarbons fed as follows:

$$C_6 \text{ conversion: } X_{C6} = \frac{\dot{n}_{conv\ C6,feed} - \dot{n}_{conv\ C6,prod}}{\dot{n}_{conv\ C6,feed}} \quad \text{Eq. 5}$$

$$C_7 \text{ conversion: } X_{C7} = \frac{\dot{n}_{conv\ C7,feed} - \dot{n}_{conv\ C7,prod}}{\dot{n}_{conv\ C7,feed}} \quad \text{Eq. 6}$$

$$C_6 + C_7 \text{ conversion: } X_{C6+C7} = \frac{\dot{n}_{conv\ C6,feed} + \dot{n}_{conv\ C7,feed} - \dot{n}_{conv\ C6,prod} - \dot{n}_{conv\ C7,prod}}{\dot{n}_{conv\ C6,feed} + \dot{n}_{conv\ C7,feed}} \quad \text{Eq. 7}$$

In these equations, $\dot{n}$ indicates a molar flow rate in a continuous reactor or the number of moles in a batch reactor.

A "tonne" is used herein to refer to a metric ton, that is, a unit of mass equal to 1,000 kilograms.

The Abstract of this application is not intended to be used to construe the scope of the claims or to limit the scope of the subject matter that is disclosed herein, but rather to satisfy the requirements of 37 C.F.R. § 1.72(b), to enable the United States Patent and Trademark Office and the public generally to determine quickly from a cursory inspection the nature and gist of the technical disclosure. Moreover, any headings that are employed herein are also not intended to be used to construe the scope of the claims or to limit the scope of the subject matter that is disclosed herein. Any use of the past tense to describe any example otherwise indicated as constructive or prophetic is not intended to reflect that the constructive or prophetic example has actually been carried out.

All publications and patents mentioned herein are incorporated herein by reference in their entireties for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Those skilled in the art will readily appreciate that many modifications are possible in the exemplary embodiments disclosed herein without materially departing from the novel teachings and advantages according to this disclosure.

Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

DETAILED DESCRIPTION

In one aspect, methods of regenerating spent catalysts are provided.

The spent catalyst may be a spent aromatization catalyst. The spent catalyst may include a transition metal and a catalyst support. The transition metal may be a Group 8-11 transition metal, such as platinum. A transition metal may be present in a spent catalyst at any concentration, such as from about 0.1 wt % to about 10 wt %, or from about 0.3 wt % to about 5 wt %, based on the weight of the spent catalyst. The spent catalyst may include any known catalyst support. The catalyst support, for example, may include a zeolite, an amorphous inorganic oxide, or a combination thereof. The catalyst support may include a large pore zeolite, such as a large pore zeolite having an average pore diameter of from about 7 Å to about 12 Å. The catalyst support may include an L-zeolite, a Y-zeolite, a mordenite, an omega zeolite, and/or a beta zeolite. The catalyst support may include a potassium L-zeolite or a barium ion-exchanged L-zeolite. The catalyst support may include a binder, such as a binder including alumina, silica, a mixed oxide thereof, or a mixture thereof. In some embodiments, the spent catalyst includes platinum on a KL-zeolite. In some embodiments, a spent catalyst also includes chlorine and fluorine.

In some embodiments, the methods include contacting a spent catalyst and a first stream including chlorine gas ($Cl_2$) to produce a chlorinated catalyst; and contacting the chlorinated catalyst and a second stream including oxygen gas ($O_2$) to form a regenerated catalyst.

In some embodiments, a spent catalyst has a dispersion of a transition metal catalyst of about 20% to about 50%, about 30% to about 50%, about 40% to about 50%, about 42% to about 48%, about 44% to about 46%, or about 45%, and a regenerated catalyst has a dispersion of the transition metal catalyst of at least about 60%, at least about 65%, or at least about 70%. In some embodiments, the regenerated catalyst has a dispersion of the transition metal catalyst of about 60% to about 80%, about 60% to about 70%, or about 70% to about 80%. In some embodiments, a spent catalyst has a first dispersion of a transition metal catalyst, and a regenerated catalyst has a second dispersion of a transition metal catalyst, and the second dispersion may be at least about 10 percentage points, at least about 15 percentage points, at least about 20 percentage points, at least about 25 percentage points, at least about 30 percentage points, at least about 35 percentage points, at least about 40 percentage points, at least about 45 percentage points, or at least about 50 percentage points greater than the first dispersion (e.g., if a first dispersion is 30% and a second dispersion is 70%, then the second dispersion is 40 percentage points greater than the first dispersion).

The contacting of the spent catalyst and the first stream may occur for any effective time. In some embodiments, the contacting of the spent catalyst and the first stream occurs for about 1 hours to about 5 hours, about 2 hours to about 4 hours, about 2.5 hours to about 3.5 hours, or about 3 hours.

The contacting of a spent catalyst and a first stream including chlorine gas may occur at any effective temperature. In some embodiments, the contacting of the spent catalyst and the first stream occurs at a temperature of about 200° F. to about 500° F., about 300° F. to about 500° F., about 350° F. to about 450° F., about 375° F. to about 425° F., or about 390° F. to about 410° F.

Chlorine gas may be present in a first stream at any concentration that achieves a desirable result in the methods provided herein. In some embodiments, the chlorine gas is present in the first stream at an amount of about 0.01% to about 50%, about 0.01% to about 40%, about 0.01% to about 30%, about 0.01% to about 20%, about 0.01% to about 10%, about 0.01% to about 5%, about 0.01% to about 3%, about 0.01% to about 1%, about 0.01% to about 0.5%, about 0.01% to about 0.1%, about 0.01% to about 0.08%, about 0.02% to about 0.08%, about 0.03% to about 0.08%, about 0.04% to about 0.06%, or about 0.05%, by mole fraction.

The first stream may include one or more gases other than chlorine. The first stream, for example, may include nitrogen gas. In some embodiments, nitrogen gas is present in the first stream at an amount of about 50% to about 99.99%, about 60% about 99.99%, about 70% to about 99.99%, about 80% to about 99.99%, about 90% to about 99.99%, about 95% to about 99.99%, about 99% to about 99.99%, or about 99.5% to about 99.99%, by mole fraction.

A first stream including chlorine gas may be provided at a flow rate. In some embodiments, the first stream has a flow rate of about 1,000 mL/minute to about 2,000 mL/minute, about 1,250 mL/minute to about 1,750 mL/minute, about 1,400 mL/minute to about 1,600 mL/minute, or about 1,500 mL/minute.

In some embodiments, a chlorinated catalyst is purged. Therefore, the methods provided herein may include, prior to the contacting of the chlorinated catalyst and the second stream, purging the chlorinated catalyst. The purging of a chlorinated catalyst may be achieved using any known technique, including, but not limited to, contacting a chlorinated catalyst with an inert gas, such as nitrogen or argon. The contacting of the chlorinated catalyst and the inert gas may occur at any effective temperature, such as a temperature of about 250° F. to about 550° F., about 300° F. to about 500° F., about 350° F. to about 450° F., or about 400° F. The contacting of a chlorinated catalyst and an inert gas may occur for any effective time, such as about 10 hours to about 20 hours, about 12 hours to about 18 hours, about 14 hours to about 18 hours, or about 16 hours. The inert gas may have a flow rate of about 1,000 mL/minute to about 2,000 mL/minute, about 1,250 mL/minute to about 1,750 mL/minute, about 1,400 mL/minute to about 1,600 mL/minute, or about 1,500 mL/minute.

The contacting of a chlorinated catalyst and a second stream may occur at any temperature effective to achieve a desirable result. In some embodiments, the contacting of the chlorinated catalyst and the second stream occurs at a temperature of about 300° F. to about 1,000° F., about 300° F. to about 900° F., about 300° F. to about 800° F., about 300° F. to about 700° F. about 300° F. to about 600° F., about 350° F. to about 550° F., about 400° F. to about 550° F., about 450° F. to about 550° F., or about 450° F. to about 500° F.

A second stream may include oxygen gas at any effective concentration. In some embodiments, the oxygen gas is present in the second stream at an amount of about 0.5% to about 40%, about 0.5% to about 21%, about 5% to about 21%, about 10% to about 21%, about 15% to about 21%, or about 18% to about 21%, by mole fraction.

A second stream may include one or more gases other than oxygen. The one or more gases other than oxygen may include nitrogen. In some embodiments, the second stream is, or includes, air.

The contacting of a chlorinated catalyst and a second stream may occur for any time effective to achieve a desirable result. The time may depend on one or more factors, including, but not limited to, a reactor selected for the process, $O_2$ concentration, etc. In some embodiments, the contacting of the chlorinated catalyst and second stream occurs for about 30 minutes to about 2,000 hours, about 1 hour to about 2,000 hours, about 24 hours to about 2,000 hours, about 48 hours to about 2,000 hours, about 72 hours to about 2,000 hours, about 100 hours to about 2,000 hours, about 500 hours to about 2,000 hours, about 750 hours to about 2,000 hours, about 1,000 hours to about 2,000 hours, about 1,250 hours to about 2,000 hours, or about 1,500 hours to about 2,000 hours.

A second stream may be provided at a flow rate. In some embodiments, the second stream has a flow rate of about 200 mL/minute to about 800 mL/minute, about 300 mL/minute to about 700 mL/minute, about 400 mL/minute to about 600 mL/minute, or about 500 mL/minute.

Prior to contacting a spent catalyst and a first stream, a spent catalyst may be subjected to one or more pre-treatments, such as drying. The drying may be achieved using any known technique. Not wishing to be bound by any particular theory, it is believed that drying a spent catalyst prior to contacting the spent catalyst and a first stream may prevent or reduce the likelihood of negatively impacting a reactor, such as a reactor's metallurgy. Prior to contacting a spent catalyst and a first stream, a spent catalyst may be dried until the spent catalyst has a desired moisture content, such as about 100 ppm or less, about 75 ppm or less, or about 50 ppm or less. In some embodiments, the drying of a spent catalyst includes contacting the spent catalyst with an inert gas, such as argon or nitrogen. Not wishing to be bound by any particular theory, it is believed that contacting the spent catalyst with an inert gas, e.g., purging the spent catalyst, may be advantageous because a catalyst may be exposed to $H_2$ during its use. The contacting of the spent catalyst and the inert gas may occur at any temperature effective to dry a spent catalyst, such as a temperature of about 300° F. to about 500° F., about 350° F. to about 450° F., or about 400° F. The contacting of a spent catalyst and an inert gas may occur for any effective time, such as about 10 hours to about 20 hours, about 12 hours to about 18 hours, about 14 hours to about 18 hours, or about 16 hours. An inert gas may be provided at a flow rate, such as a flow rate of about 1,000 mL/minute to about 2,000 mL/minute, about 1,250 mL/minute to about 1,750 mL/minute, about 1,400 mL/minute to about 1,600 mL/minute, or about 1,500 mL/minute.

When a spent catalyst is regenerated according to embodiments of the methods provided herein, the resulting regenerated catalyst may achieve an aromatics yield that is comparable to a fresh catalyst. For example, a spent catalyst may achieve an aromatics yield of less than 50%, about 35% to about 50%, or about 40% to about 50%, and a regenerated catalyst achieves an aromatics yield of about 60% to about 75%, about 65% to about 75%, or about 70% to about 75%. As a further example, a spent catalyst may achieve an aromatics selectivity (mol/mol) of less than about 0.925, about 0.9 to about 0.925, about 0.91 to about 0.925, or about 0.92 to about 0.925, and a regenerated catalyst may achieve an aromatics selectivity (mol/mol) of greater than about 0.93, about 0.93 to about 0.94, or about 0.93 to about 0.94.

A spent catalyst may include a greater concentration of carbon than a regenerated catalyst. In some embodiments, carbon is present in a spent catalyst at an amount of about 1 wt % to about 3 wt %, about 1 wt % to about 2.5 wt %, about 1 wt % to about 2 wt %, or about 1 wt % to about 1.5 wt %, based on the weight of the spent catalyst, and carbon is present in a regenerated catalyst at an amount of about 0.01 wt % to about 0.3 wt %, about 0.05 wt % to about 0.2 wt %, or about 0.05 wt % to about 0.15 wt %, based on the weight of the regenerated catalyst.

In some embodiments, the methods provided herein include catalyzing a chemical reaction with the regenerated catalyst, thereby converting the regenerated catalyst to a second spent catalyst. The second spent catalyst and the first stream including chlorine gas ($Cl_2$) may be contacted to produce a second chlorinated catalyst; and the second chlorinated catalyst and the second stream including oxygen ($O_2$) may be contacted to form a second regenerated catalyst. The second regenerated catalyst then may be used to catalyze a chemical reaction, such as an aromatization reaction. This process may be repeated until the catalyst regenerated by the methods does not perform at a desirable level, such as with respect to yield, selectivity, etc.

Aspects

The following is a non-limiting list of Aspects of the disclosure.

Aspect 1. A method of regenerating a spent catalyst comprising a transition metal and a catalyst support, the method comprising (consisting essentially of, or consisting of): contacting the spent catalyst and a first stream comprising (consisting essentially of, or consisting of) chlorine gas ($Cl_2$) to produce a chlorinated catalyst; and contacting the chlorinated catalyst and a second stream comprising (consisting essentially of, or consisting of) oxygen gas ($O_2$) to form a regenerated catalyst.

Aspect 2. The method of Aspect 1, wherein the contacting of the spent catalyst and the first stream occurs at a temperature of about 200° F. to about 500° F., about 300° F. to about 500° F., about 350° F. to about 450° F., about 375° F. to about 425° F., or about 390° F. to about 410° F.

Aspect 3. The method of Aspect 1 or 2, wherein (i) the chlorine gas is present in the first stream at an amount of about 0.01% to about 50%, about 0.01% to about 40%, about 0.01% to about 30%, about 0.01% to about 20%, about 0.01% to about 10%, about 0.01% to about 5%, about 0.01% to about 3%, about 0.01% to about 1%, about 0.01% to about 0.5%, about 0.01% to about 0.1%, about 0.01% to about 0.08%, about 0.02% to about 0.08%, about 0.03% to about 0.08%, about 0.04% to about 0.06%, or about 0.05%, by mole fraction, and, optionally, (ii) nitrogen gas ($N_2$) is present in the first stream at an amount of about 50% to about 99.99%, about 60% about 99.99%, about 70% to about 99.99%, about 80% to about 99.99%, about 90% to about 99.99%, about 95% to about 99.99%, about 99% to about 99.99%, or about 99.5% to about 99.99%, by mole fraction.

Aspect 4. The method of any of the preceding Aspects, wherein the contacting of the spent catalyst and the first stream occurs for about 1 hours to about 5 hours, about 2 hours to about 4 hours, about 2.5 hours to about 3.5 hours, or about 3 hours.

Aspect 5. The method of any of the preceding Aspects, wherein the first stream has a flow rate of about 1,000 mL/minute to about 2,000 mL/minute, about 1,250 mL/minute to about 1,750 mL/minute, about 1,400 mL/minute to about 1,600 mL/minute, or about 1,500 mL/minute.

Aspect 6. The method of any of the preceding Aspects, wherein the contacting of the chlorinated catalyst and the second stream occurs at a temperature of about 300° F. to about 1,000° F., about 300° F. to about 900° F., about 300° F. to about 800° F., about 300° F. to about 700° F., about 300° F. to about 600° F., about 350° F. to about 550° F., about 400° F. to about 550° F., about 450° F. to about 550° F., or about 450° F. to about 500° F.

Aspect 7. The method of any of the preceding Aspects, wherein the oxygen gas is present in the second stream at an amount of about 0.5% to about 40%, about 0.5% to about 21%, about 5% to about 21%, about 10% to about 21%, about 15% to about 21%, or about 18% to about 21%, by mole fraction.

Aspect 8. The method of any of the preceding Aspects, wherein the second stream comprises (consists essentially of, or consists of) air.

Aspect 9. The method of any of the preceding Aspects, wherein the contacting of the chlorinated catalyst and second stream occurs for about 30 minutes to about 2,000 hours, about 1 hour to about 2,000 hours, about 24 hours to about 2,000 hours, about 48 hours to about 2,000 hours, about 72 hours to about 2,000 hours, about 100 hours to about 2,000 hours, about 500 hours to about 2,000 hours, about 750 hours to about 2,000 hours, about 1,000 hours to about 2,000 hours, about 1,250 hours to about 2,000 hours, or about 1,500 hours to about 2,000 hours.

Aspect 10. The method of any of the preceding Aspects, wherein the second stream has a flow rate of about 200 mL/minute to about 800 mL/minute, about 300 mL/minute to about 700 mL/minute, about 400 mL/minute to about 600 mL/minute, or about 500 mL/minute.

Aspect 11. The method of any of the preceding Aspects, further comprising, prior to the contacting of the spent catalyst and the first stream, drying the spent catalyst.

Aspect 12. The method of Aspect 11, wherein the drying of the spent catalyst comprises (consists essentially of, or consists of) contacting the spent catalyst with an inert gas, such as argon or nitrogen.

Aspect 13. The method of Aspect 12, wherein the contacting of the spent catalyst and the inert gas occurs at a temperature of about 300° F. to about 500° F., about 350° F. to about 450° F., or about 400° F.

Aspect 14. The method of Aspect 12 or 13, wherein the contacting of the spent catalyst and the inert gas occurs for about 10 hours to about 20 hours, about 12 hours to about 18 hours, about 14 hours to about 18 hours, or about 16 hours.

Aspect 15. The method of any of Aspects 12 to 14, wherein the inert gas has a flow rate of about 1,000 mL/minute to about 2,000 mL/minute, about 1,250 mL/minute to about 1,750 mL/minute, about 1,400 mL/minute to about 1,600 mL/minute, or about 1,500 mL/minute.

Aspect 16. The method of any of the preceding Aspects, further comprising, prior to the contacting of the chlorinated catalyst and the second stream, purging the chlorinated catalyst.

Aspect 17. The method of Aspect 16, wherein the purging of the chlorinated catalyst comprises contacting the chlorinated catalyst with an inert gas, such as nitrogen or argon.

Aspect 18. The method of Aspect 17, wherein the contacting of the chlorinated catalyst and the inert gas occurs at a temperature of about 250° F. to about 550° F., about 300° F. to about 500° F., about 350° F. to about 450° F., or about 400° F.

Aspect 19. The method of Aspect 17 or 18, wherein the contacting of the chlorinated catalyst and the inert gas occurs for about 10 hours to about 20 hours, about 12 hours to about 18 hours, about 14 hours to about 18 hours, or about 16 hours.

Aspect 20. The method of any of Aspects 17 to 19, wherein the inert gas has a flow rate of about 1,000 mL/minute to about 2,000 mL/minute, about 1,250 mL/minute to about 1,750 mL/minute, about 1,400 mL/minute to about 1,600 mL/minute, or about 1,500 mL/minute.

Aspect 21. The method of any of the preceding Aspects, wherein the spent catalyst has a dispersion of the transition metal catalyst of about 20% to about 50%, about 30% to about 50%, about 40% to about 50%, about 42% to about 48%, about 44% to about 46%, or about 45%.

Aspect 22. The method of any of the preceding Aspects, wherein the regenerated catalyst has a dispersion of the transition metal catalyst of at least about 60%, at least about 65%, or at least about 70%, or wherein the regenerated catalyst has a dispersion of the transition metal catalyst of about 60% to about 80%, about 60% to about 70%, or about 70% to about 80%.

Aspect 23. The method of any of the preceding Aspects, wherein the spent catalyst has a first dispersion of a transition metal catalyst, and the regenerated catalyst has a second dispersion of a transition metal catalyst, and the second dispersion is at least about 10 percentage points, at least about 15 percentage points, at least about 20 percentage points, at least about 25 percentage points, at least about 30 percentage points, at least about 35 percentage points, at least about 40 percentage points, at least about 45 percentage points, or at least about 50 percentage points greater than the first dispersion.

Aspect 24. The method of any of the preceding Aspects, wherein the spent catalyst achieves an aromatics yield of less than 50%, about 35% to about 50%, or about 40% to about 50%.

Aspect 25. The method of any of the preceding Aspects, wherein the regenerated catalyst achieves an aromatics yield of about 60% to about 75%, about 65% to about 75%, or about 70% to about 75%.

Aspect 26. The method of any of the preceding Aspects, wherein the spent catalyst achieves an aromatics selectivity (mol/mol) of less than about 0.925, about 0.9 to about 0.925, about 0.91 to about 0.925, or about 0.92 to about 0.925.

Aspect 27. The method of any of the preceding Aspects, wherein the regenerated catalyst achieves an aromatics selectivity (mol/mol) of greater than about 0.93, about 0.93 to about 0.94, or about 0.93 to about 0.94.

Aspect 28. The method of any of the preceding Aspects, wherein carbon is present in the spent catalyst at an amount of about 1 wt % to about 3 wt %, about 1 wt % to about 2.5 wt %, about 1 wt % to about 2 wt %, or about 1 wt % to about 1.5 wt %, based on the weight of the spent catalyst.

Aspect 29. The method of any of the preceding Aspects, wherein carbon is present in the regenerated catalyst at an amount of about 0.01 wt % to about 0.3 wt %, about 0.05 wt % to about 0.2 wt %, or about 0.05 wt % to about 0.15 wt %, based on the weight of the regenerated catalyst.

Aspect 30. The method of any of the preceding Aspects, wherein the transition metal comprises (consists essentially of, or consists of) a Group 8-11 transition metal.

Aspect 31. The method of any of the preceding Aspects, wherein the transition metal comprises (consists essentially of, or consists of) platinum.

Aspect 32. The method of any of the preceding Aspects, wherein the catalyst support comprises a large pore zeolite, such as a large pore zeolite having an average pore diameter of from about 7 Å to about 12 Å.

Aspect 33. The method of any of the preceding Aspects, wherein the catalyst support comprises a zeolite, an amorphous inorganic oxide, or a combination thereof.

Aspect 34. The method of any of the preceding Aspects, wherein the catalyst support comprises an L-zeolite, a Y-zeolite, a mordenite, an omega zeolite, and/or a beta zeolite.

Aspect 35. The method of any of the preceding Aspects, wherein the catalyst support comprises a potassium L-zeolite or a barium ion-exchanged L-zeolite.

Aspect 36. The method of any of the preceding Aspects, wherein the catalyst support comprises a binder, such as a binder comprising (consisting essentially of, or consisting of) alumina, silica, a mixed oxide thereof, or a mixture thereof.

Aspect 37. The method of any of the preceding Aspects, wherein the transition metal is present in the spent catalyst at an amount of about 0.1 wt % to about 10 wt %, or from about 0.3 wt % to about 5 wt %, based on the weight of the spent catalyst.

Aspect 38. The method of any of the preceding Aspects, wherein the spent catalyst comprises platinum on a KL-zeolite.

Aspect 39. The method of any of the preceding Aspects, wherein the spent catalyst further comprises chlorine and fluorine.

Aspect 40. The method of any of the preceding Aspects, further comprising catalyzing a chemical reaction with the regenerated catalyst, thereby converting the regenerated catalyst to a second spent catalyst.

Aspect 41. The method of Aspect 40, further comprising contacting the second spent catalyst and the first stream comprising (consisting essentially of, or consisting of) chlorine gas ($Cl_2$) to produce a second chlorinated catalyst; and contacting the second chlorinated catalyst and the second stream comprising (consisting essentially of, or consisting of) oxygen ($O_2$) to form a second regenerated catalyst.

Aspect 42. The method of Aspect 40, wherein the second regenerated catalyst is subjected to the method of any one of Aspects 1 to 20.

Aspect 43. The method of any one of Aspects 40 to 42, wherein the elements of any one or more of Aspects 21 to 29 read on the second spent catalyst and/or the second regenerated catalyst.

Aspect 44. The method of any one of Aspects 40 to 43, wherein the chemical reaction comprises an aromatization reaction, such as a reaction that includes contacting the regenerated catalyst and any nonaromatic compound herein, such as a cyclic hydrocarbon, to produce any aromatic compounds described herein.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Example 1—Treatment of Spent Catalyst

In this example, a procedure was used that restored, or at least improved, the metal dispersion of a spent aromatization catalyst.

A spent commercial aromatization catalyst was loaded into a reactor having an outer diameter of about one inch.

The catalyst was dried overnight (about 16 hours) with about 1500 mL/minute of nitrogen gas ($N_2$) at about 400° F.

After the drying, the temperature was decreased to about 300° F. When the temperature was stabilized, the catalyst was contacted for about 3 hours with a gas stream formed by combining the following two streams: (i) about 40 mL/minute of a blend of $N_2$ and about 2% $Cl_2$, and (ii) about 1460 mL/minute of $N_2$.

After this chlorination process, the temperature of the catalyst was increased to about 400° F., and the catalyst was then purged using about 1500 mL/minute of $N_2$ overnight (about 16 hours).

After the purge, the flow of $N_2$ was stopped, and the catalyst was contacted with air (about 500 mL/minute) for about 1 hours to about 2 hours at about 850° F. to about 900° F.

After the oxidation, the reactor was cooled to about room temperature, and the catalyst was tested, as described herein.

Example 2—Testing and Characterization of Treated Catalyst

The spent catalysts subjected to the treatment of Example 1, wherein the oxidation step times and temperatures were varied according to the following table, were then tested according to the methods of this example. The results of this example are summarized in the following table:

| | Cl (%) | C (%) | Ramp (° F./minute) | Hold (hours) | Temp. (° F.) | Platinum Dispersion (D) (%) |
|---|---|---|---|---|---|---|
| Spent Catalyst | 0.153 | 1.33 | N/A | N/A | N/A | 45 |
| Holding Time Effect | | | | | | |
| Cl-Ox-1 h-850° F. | 0.764 | 0.14 | 7.5 | 1 | 850 | 72 |
| Cl-Ox-2 h-850° F. | 0.826 | 0.10 | 7.5 | 2 | 850 | 74 |
| Temperature Effect | | | | | | |
| Cl-Ox-2 h-850° F. | 0.826 | 0.10 | 7.5 | 2 | 850 | 74 |
| Cl-Ox-2 h-900° F. | 0.689 | 0.05 | 7.5 | 2 | 900 | 72 |

The data of this table demonstrated that the chlorination and oxidation procedure of Example 1 increased the Pt dispersion, and that no significant effect was observed when the holding time and/or the temperature were changed.

Figure 2:
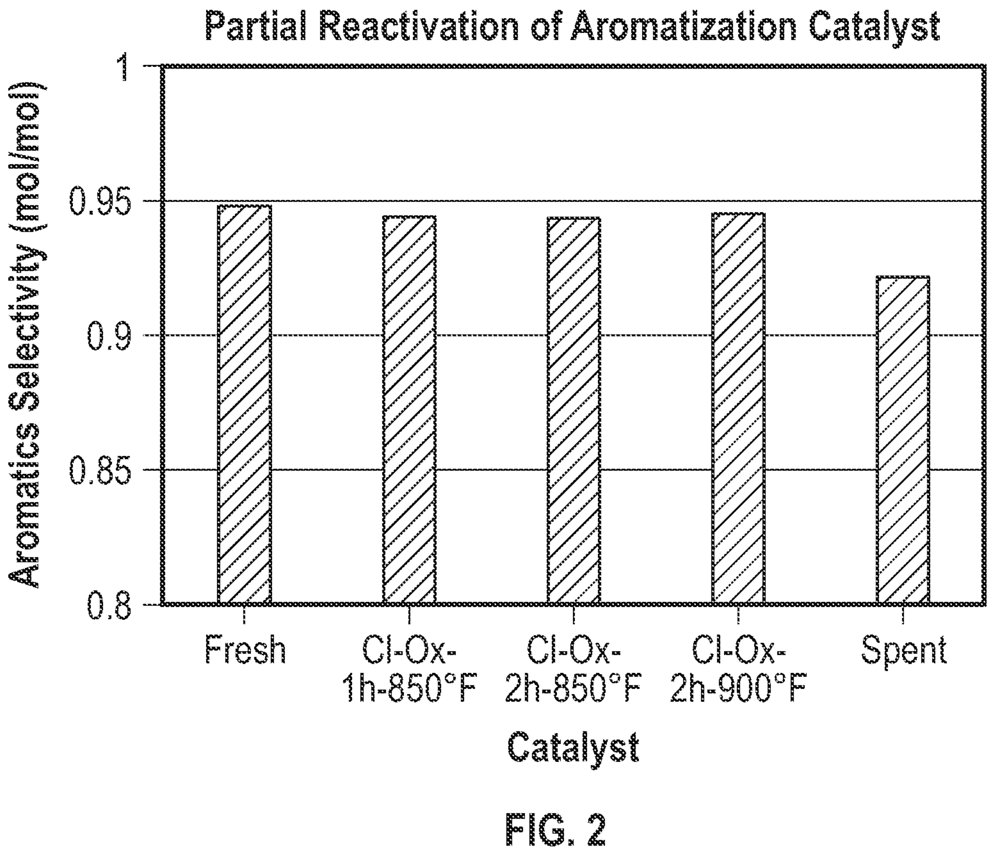
FIG. 2 depicts the aromatics selectivity of embodiments of fresh, spent, and catalysts treated according to an embodiment of a method provided herein.

FIG. 1 depicts the aromatics yield (%) of a fresh catalyst, a spent catalyst, and those subjected to the various treatments of Example 1. FIG. 2 depicts the aromatics selectivity (mol/mol) of a fresh catalyst, a spent catalyst, and those subjected to the various treatments of Example 1. The results of FIG. 1 and FIG. 2 demonstrated that by chlorinating and reducing the carbon of a spent aromatization catalyst, it was possible to re-disperse the platinum, and recover significant catalyst activity and selectivity.

For the tests of this example, about 2 $cm^3$ (about 1.38 g) of the treated catalyst was loaded into a reactor. An aromatization reaction was then performed at a pressure of about 50 psig, a temperature of about 900° F., and with a hydrogen gas ($H_2$) flow rate of about 66 mL/minute. The aromatics yield and selectivity at the end of a run was equal to the average of the adjusted catalyst temperature from about 25 hours to about 40 hours.

The Cl concentration in the treated catalyst was determined using X-ray fluorescence spectroscopy. The platinum dispersion was determined using CO chemisorption. Chemisorption is a common technique for determining the active surface area of supported metal catalysts. In general, there are two types of chemisorption analysis done with different gasses. Static and dynamic chemisorption can be used, but static was used in this application, including the examples.

Figure 3:
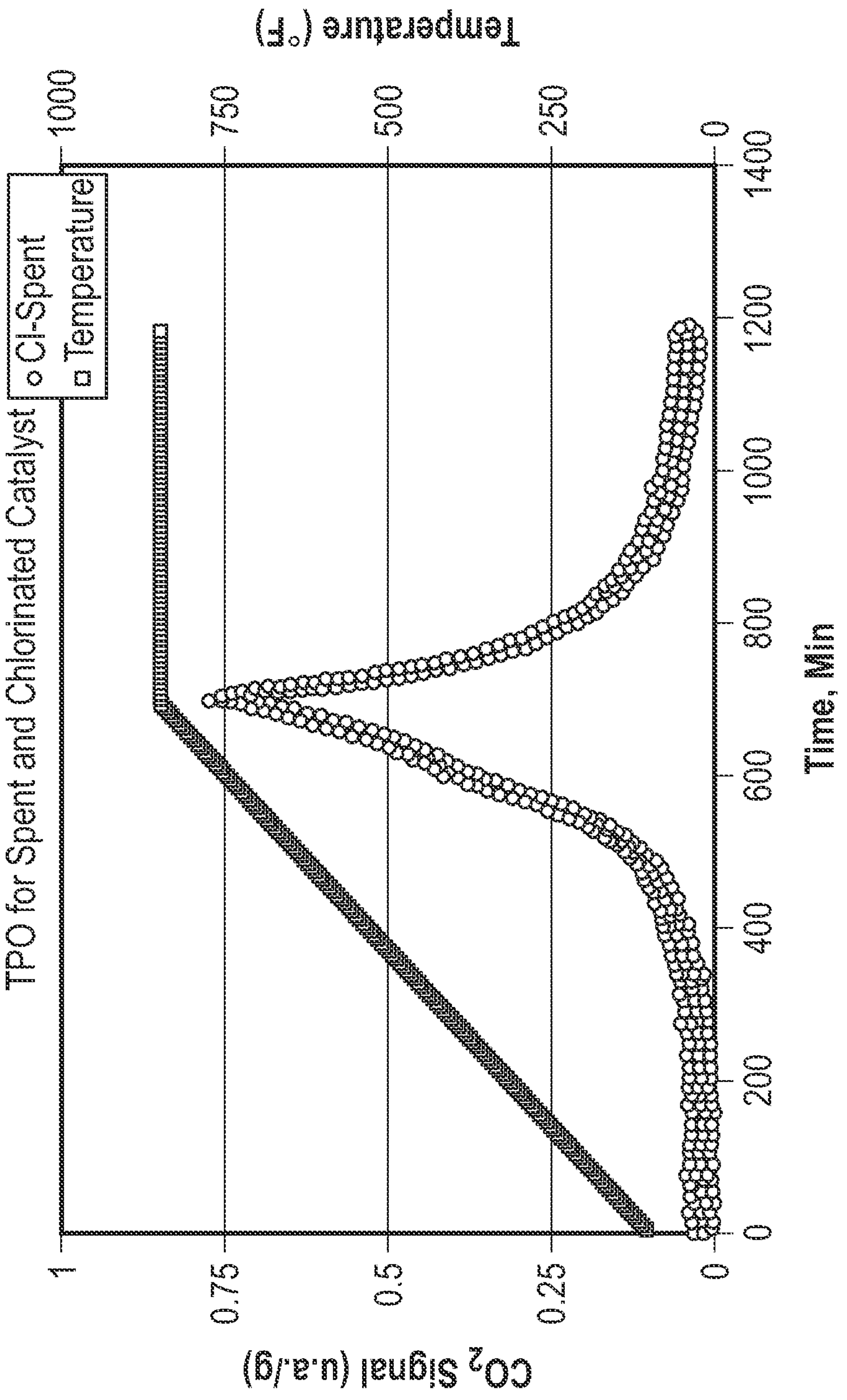
FIG. 3 depicts a plot of temperature program oxidation results.

Temperature program oxidation (TPO) experiments were performed using a Micromeritics AutoChem II 2920 catalyst characterization system coupled to an MKS Cirrus II Quadupole Mass Spectrometer RGA. The chlorinated spent catalyst was exposed to a blend of about 3% of $O_2$ in Ar under controlled conditions. Temperature program oxidation results are depicted at FIG. 3.

Figure 4:
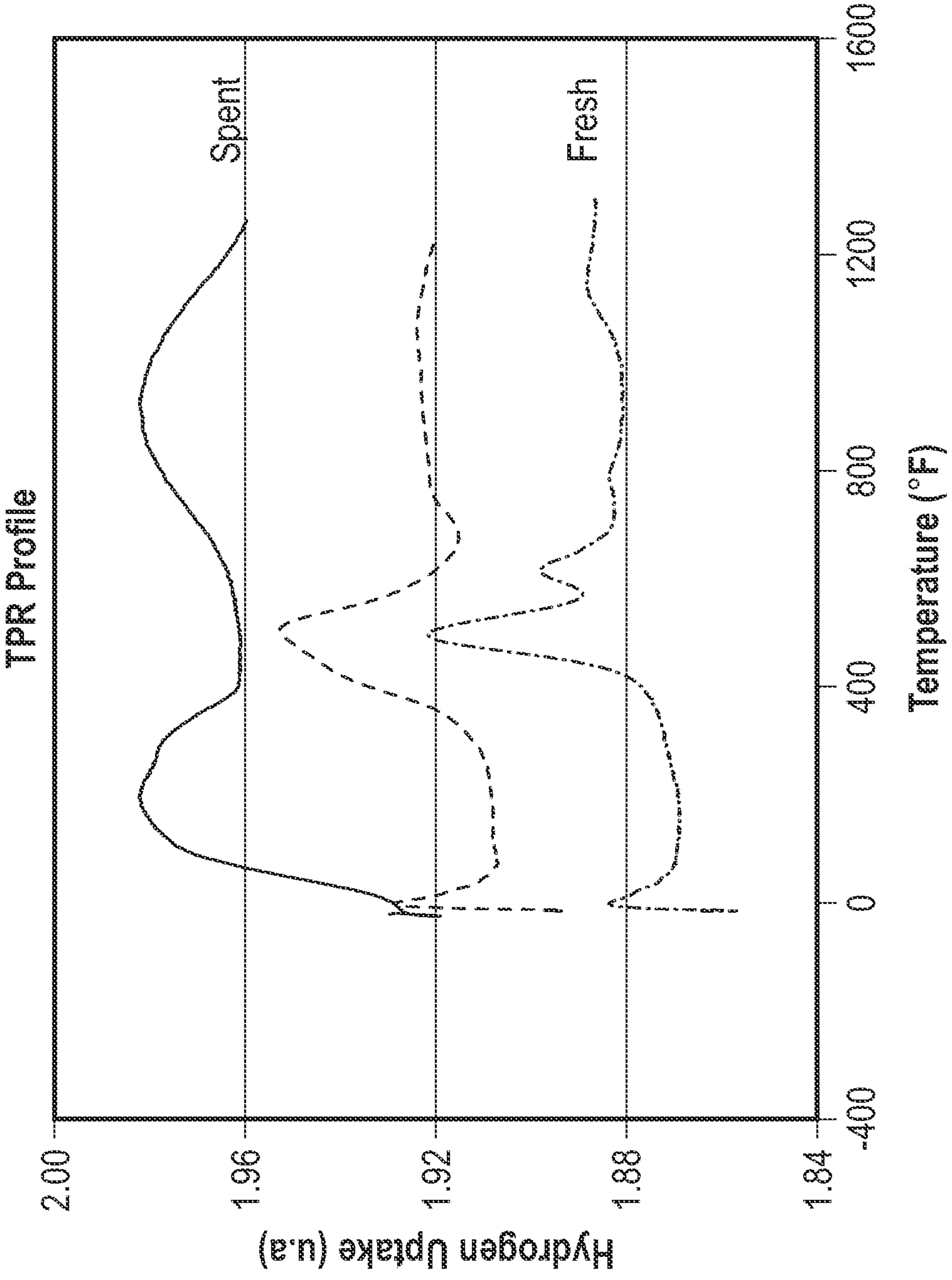
FIG. 4 depicts a plot of temperature program reduction results.

Temperature program reduction (TPR) experiments were performed using an AutoChem II 2920 catalyst characterization system coupled to an MKS CIRRUS™ II Quadrupole Mass Spectrometer residual gas analyzer (RGA) (MICROMERITICS® Instrument Corporation, USA). The partial regenerated catalyst was exposed to a blend of about 10% of 02 in Ar under controlled conditions. This test was used to study the platinum reduction pattern, and, in some instances, the platinum interaction and migration in the zeolite. Temperature program reduction results are depicted at FIG. 4.

We claim:

1. A method of regenerating a spent catalyst comprising a transition metal catalyst and a catalyst support, the method comprising:
- contacting the spent catalyst and a first stream comprising chlorine gas ($Cl_2$) to produce a chlorinated catalyst; and
- contacting the chlorinated catalyst and a second stream comprising oxygen gas ($O_2$) to form a regenerated catalyst,
- wherein the spent catalyst has a dispersion of the transition metal catalyst of about 20% to about 50% as measured by CO chemisorption, and the regenerated catalyst has a dispersion of the transition metal catalyst of at least about 60% as measured by CO chemisorption.

2. The method of claim 1, wherein (i) the chlorine gas is present in the first stream at a mole fraction of about 0.01% to about 5%, (ii) the first stream has a flow rate of about 1,000 mL/minute to about 2,000 mL/minute, (iii) the contacting of the spent catalyst and the first stream occurs at a temperature of about 200° F. to about 500° F., (iv) the contacting of the spent catalyst and the first stream occurs for about 1 hours to about 5 hours, or (v) a combination thereof.

3. The method of claim 1, wherein the second stream comprises air.

4. The method of claim 1, wherein (i) the oxygen gas is present in the second stream at a mole fraction of about 0.5% to about 21%, (ii) the second stream has a flow rate of about 200 mL/minute to about 800 mL/minute, (iii) the contacting of the chlorinated catalyst and the second stream occurs at a temperature of about 300° F. to about 1,000° F., (iv) the contacting of the chlorinated catalyst and the second stream occurs for about 30 minutes to about 2,000 hours, or (v) a combination thereof.

5. The method of claim 1, further comprising, prior to the contacting of the spent catalyst and the first stream, drying the spent catalyst.

6. The method of claim 5, wherein the drying of the spent catalyst comprises contacting the spent catalyst with an inert gas.

7. The method of claim 6, wherein (i) the inert gas has a flow rate of about 1,000 mL/minute to about 2,000 mL/minute, (ii) the contacting of the spent catalyst and the inert gas occurs at a temperature of about 300° F. to about 500° F., (iii) the contacting of the spent catalyst and the inert gas occurs for about 10 hours to about 20 hours, or (iv) a combination thereof.

8. The method of claim 1, wherein the regenerated catalyst has a dispersion of the transition metal catalyst of at least about 65%.

9. The method of claim 1, wherein the spent catalyst achieves an aromatics yield of less than 50%, and the regenerated catalyst achieves an aromatics yield of about 60% to about 75%.

10. The method of claim 1, wherein the spent catalyst achieves an aromatics selectivity (mol/mol) of less than about 0.925, and the regenerated catalyst achieves an aromatics selectivity (mol/mol) of greater than about 0.93.

11. The method of claim 1, wherein carbon is present in the spent catalyst at an amount of about 1 wt % to about 3 wt %, based on the weight of the spent catalyst, and carbon is present in the regenerated catalyst at an amount of about 0.01 wt % to about 0.3 wt %, based on the weight of the regenerated catalyst.

12. The method of claim 1, further comprising catalyzing a chemical reaction with the regenerated catalyst, thereby converting the regenerated catalyst to a second spent catalyst.

13. The method of claim 12, further comprising contacting the second spent catalyst and the first stream comprising chlorine gas ($Cl_2$) to produce a second chlorinated catalyst; and contacting the second chlorinated catalyst and the second stream comprising oxygen ($O_2$) to form a second regenerated catalyst.

14. A method of regenerating a spent catalyst comprising a transition metal catalyst and a catalyst support, the method comprising:
- providing the spent catalyst, wherein the spent catalyst has a first dispersion of the transition metal catalyst as measured by CO chemisorption;
- drying the spent catalyst to produce a dried catalyst having a moisture content of 50 ppm or less, wherein the drying of the spent catalyst comprises contacting the spent catalyst and an inert gas;
- contacting the dried catalyst and a first stream comprising chlorine gas ($Cl_2$) to produce a chlorinated catalyst, wherein the chlorine gas is present in the first stream at a mole fraction of about 0.01% to about 5%; and
- contacting the chlorinated catalyst and a second stream comprising oxygen gas ($O_2$) to form a regenerated catalyst having a second dispersion of the transition metal catalyst as measured by CO chemisorption;
- wherein the second dispersion of the transition metal catalyst is at least 10 percentage points greater than the first dispersion of the transition metal catalyst.

15. The method of claim 14, wherein the spent catalyst achieves an aromatics yield of less than 50%, and the regenerated catalyst achieves an aromatics yield of about 60% to about 75%.

16. The method of claim 14, wherein the spent catalyst achieves an aromatics selectivity (mol/mol) of less than about 0.925, and the regenerated catalyst achieves an aromatics selectivity (mol/mol) of greater than about 0.93.

17. The method of claim 14, further comprising catalyzing a chemical reaction with the regenerated catalyst, thereby converting the regenerated catalyst to a second spent catalyst.

18. The method of claim 14, wherein the second dispersion of the transition metal catalyst is at least 20 percentage points greater than the first dispersion of the transition metal catalyst.

19. The method of claim 14, wherein the second dispersion of the transition metal catalyst is at least 30 percentage points greater than the first dispersion of the transition metal catalyst.

* * * * *